CHARLES S. LYNCH AND J. AUGUSTUS LYNCH, OF BOSTON, MASSACHUSETTS, AND CHARLES E. COFFIN, OF MUIRKIRK, MARYLAND.

Letters Patent No. 89,228, dated April 20, 1869.

IMPROVED MODE OF UTILIZING IRON-TURNINGS, &c.

The Schedule referred to in these Letters Patent and making part of the same.

*To all persons to whom these presents may come:*

Be it known that we, CHARLES S. LYNCH and J. AUGUSTUS LYNCH, of Boston, of the county of Suffolk, and State of Massachusetts, and CHARLES E. COFFIN, of Muirkirk, of the county of Prince George's, and State of Maryland, have made a new and useful invention, which has for its object the utilizing of common iron-turnings, borings, or filings, such as are produced in the cutting, boring, turning, or filing of iron in machine-shops, and which, for various reasons, have heretofore been of little comparative use or value; and we do hereby declare the said invention to be described as follows:

It is known that when such borings or turnings are put into a blast or smelting-furnace, with ore, they will not melt, but are liable to be, and generally are, burned or destroyed. This arises from the fact that they are not sufficiently protected by the metal of the ore.

We have found, that by mixing them with the metal, by casting it, in a molten state, upon them, and at the same time, stirring them and the metal together, they may be incorporated with the latter in such manner, that when the metal is remelted, they will melt with it, without being burned or destroyed.

We have also found, that by mixing about fifteen pounds common oxide of manganese with each eighty-five pounds of the borings or turnings, and, with the mass of molten iron cast on such, and mixed therewith, we are able to effect the fluxing of the turnings or borings to better advantage.

We have reason to believe that a little charcoal-dust or sawdust thrown into the mixture will be advantageous, although we do not deem such necessary.

If the iron mixture is to be subsequently converted into wrought-iron or steel, the manganese will be particularly advantageous to it.

We are aware that it is not new to mix together cast-iron and one or more oxides in such manner, and in such proportions as to produce a solid (as distinguished from a fluid) mass, one or either of the constituents of the mixture being in a solid condition, and the other in a fluid, molten state during the process of mixing the two. Consequently, we make no claim to the mixing of one or more solid oxides into or among fluid cast-iron, or one or more fluid oxides, with solid cast-iron, granulated or minutely subdivided, the same being in such manner and quantities as to produce, when cold, a solid conglomerate, such having been the subject of an invention described in the United States Patent, No. 84,053, dated November 17, 1868.

Our invention has a different object, and accomplishes a different result, it being to effect in and by the blast or smelting-furnace, the melting and utilization of small masses of waste-iron, produced in the reduction of cast-iron, by tools, and this, we are enabled to accomplish by first mixing such masses with cast-iron, in a fluid state, so as to form with it, when cold, a conglomerate, which, on being afterwards subjected to the heat of a furnace, will afford such protection to the contained masses of filings, or waste-iron, as to cause them to melt with the encompassing cast-iron, without being destroyed or burned, as they are otherwise liable to be.

What, therefore, we claim as our invention, is—

Mixing of waste masses of solid iron, as set forth, with molten iron, preparatory to the remelting or reheating of the conglomerate, and for the purpose specified.

We also claim the employment of oxide of manganese with the waste mass of iron, as set forth, and molten iron, when mixed together, as and for the purpose as explained.

CHAS. E. COFFIN.

Witnesses:
 WM. B. SHIPLEY,
 HENRY C. JONES,

CHAS. S. LYNCH.
J. AUGUSTUS LYNCH.

Witnesses:
 R. H. EDDY,
 J. R. SNOW.